April 15, 1941.                E. HORN                2,238,645
                          ARTIFICIAL HORIZON
                          Filed Jan. 21, 1939
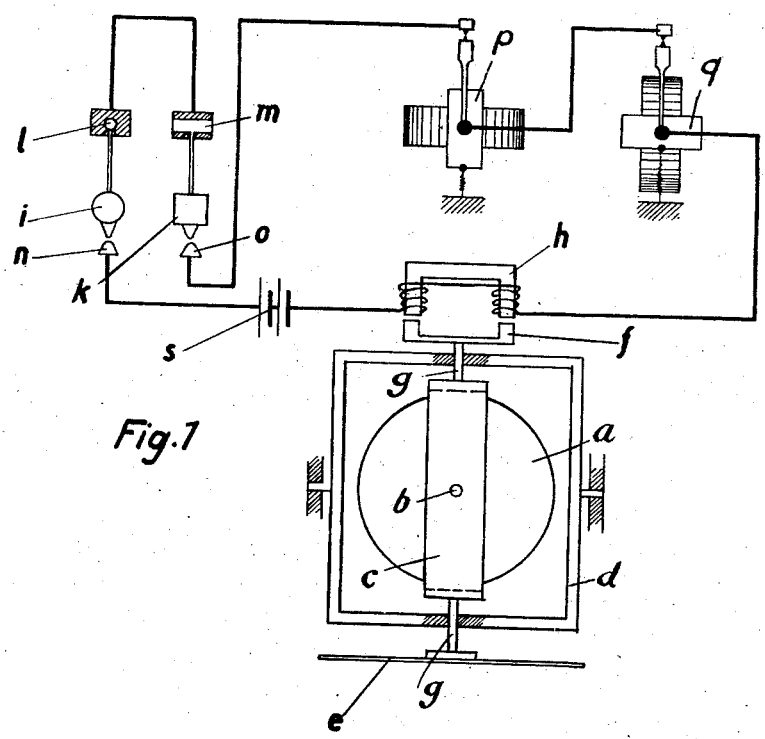
Fig. 1
Fig. 2
Inventor,
E. Horn
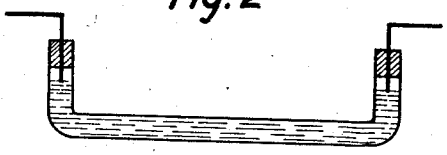
Attorneys.

Patented Apr. 15, 1941

2,238,645

UNITED STATES PATENT OFFICE 2,238,645

ARTIFICIAL HORIZON

Erhard Horn, Leipzig, Germany

Application January 21, 1939, Serial No. 252,229
In Germany January 22, 1938

2 Claims. (Cl. 74—5)

This invention relates to an artificial horizon, particularly for aircraft, provided with a gyroscope hung in gimbals and supported in its center of gravity, which has a vertical axis of rotation and to which torques produced by pendulums are applied for righting it after moving out of the horizontal plane.

The known devices of this kind are subject to fundamental defects with respect to maintaining the gyroscope in horizontal position during changes in the position of an aeroplane, which defects are due to the manner in which the pendulums act upon the gyroscope.

In the known devices the pendulums on deviating in direction from that of the axis of rotation apply torques to the gyroscope rectangularly to the axis of oscillation of the pendulum and thus bring the axis of rotation into the direction of the vertical occupied by the pendulum. In order to prevent the gyroscope during turning or acceleration of the plane from swinging into the apparent vertical occupied by the pendulums the known constructions provide means which with the aid of a revolution-meter or speedometer and turn indicator in this instance stop the application of torques about the gyroscope, though a deviation, at least a temporary one, of the gyroscope from the true horizontal plane may still occur owing to the long period of oscillation of the gyroscope which requires several minutes to return to normal position. For example, if in case of longer turns, when no righting moments are present, the gyroscope will still deviate from the position of the true horizon after the aeroplane is already in horizontal position with the result that owing to the uncertainty in recognizing the position of flight the pilot will be unable to return the plane to normal position. Furthermore, if the plane suddenly swings due for instance to a squall moments of different direction are constantly applied to the gyroscope and cause continual to and fro motion. It has been proposed to eliminate such influences by means of a slow-acting relay, but the employment of such means renders the construction of the gyroscopic system complex, increases the cost and reduces its reliability of operation.

It is the object of the invention to overcome the drawbacks of the known devices in a simple and effective manner by arranging and constructing the pendulums so that, without the use of accelerometers and revolution-meters, they apply a moment to the gyroscope only when the aeroplane is in the horizontal plane and at all other positions of flight the gyroscope is completely free instead of applying as in the known devices restoring moments to the gyroscope when the directions of the swinging and rotation axes deviate and freeing the gyroscope when these directions coincide, that is, also when the plane is in the horizontal plane. The release of the moments is so chosen that they bring the axis of rotation into the direction of the normal or vertical axis of the plane, which at horizontal position of the latter coincides with the true vertical.

The gyroscope is righted jerkily and not, as in the known devices, in a manner requiring on occasion several minutes, since the relay used for this purpose is so constructed as to prevent precession of the gyroscope.

To avoid the possibility of a release of the restoring moment during turning when the vertical axis of the plane coincides with the apparent vertical, the restoring moment is eliminated during turning by means of a turn indicator indicating rotation about the vertical axis. For the same reason another turn indicator showing rotation about the transverse axis is provided for preventing the release of the restoring moment when the plane turns about this axis.

One embodiment of the invention embodying the principle thereof is illustrated in the accompanying drawing, in which Figure 1 is a diagrammatic view of the general arrangement and Fig. 2 shows a modification in which the pendulums are replaced by mercury tubes.

As shown in Fig. 1, a gyroscope $a$ operated electrically or by air forces and having a vertical axis of rotation $b$ is suspended in Cardanic fashion in the frames $c$ and $d$ and so arranged that its point of support is located in the center of gravity. The frame $c$ is rigidly connected on one side with a transverse beam $e$ which indicates the horizontal position of the gyroscope. On the opposite side a U-shaped soft iron member $f$ is rigidly connected with the frame so as to be positioned symmetrically with the frame axis $g$ and vertically to the axis of rotation $b$. Opposite the soft iron member $f$ a similarly constructed electromagnet $h$ is secured in the casing receiving the entire device and attracts the member $f$ if electromagnetically excited. The casing further contains two pendulums $i$ and $k$ with the axes of oscillation $l$ and $m$ vertically disposed relative to one another and deflecting about the longitudinal and transverse axis at inclination of the plane. Below the pendulums contact members $n$ and $o$ are provided which make contact with the pendulums when the vertical axis of the plane coincides with the direction of the pendulums. Two turn indicators $p$ and $q$ which indicate rotations about the vertical and transverse axes of the plane are also fitted with contacts which are closed when the turn indicators are at rest and continually open at deflection of the indicators.

The pendulum and turn indicator contacts together with the electromagnet $h$ and a current source $s$ are connected in series in the same circuit so that the electromagnet is excited when all contacts are closed. If the plane is in horizontal position and flies straight, both pendulums and both turn indicators will be at rest and close the circuit fed by the battery $s$ so that the electromagnet $h$ is excited and attracts the soft iron member $f$. This means that the gyroscope is positioned perpendicularly with its axis and the transverse beam $e$ indicates the true horizontal position. When the plane inclines about the transverse or longitudinal axis, one or both pendulums deflect, the circuit is interrupted and the gyroscope receives no directive forces but maintains its position in space. The same occurs when the plane rotates about the vertical or transverse axis. Normally, the pendulums will not be at rest during turning, as the plane never turns so exactly that its vertical axis accurately coincides with the apparent vertical. To avoid, however, accidental responding of the electromagnet in such an instance the above-mentioned two turn indicators are connected in the circuit to prevent the application of the directive forces to the gyroscope.

The U-shaped construction of the electromagnet as shown permits a jerking return motion of the gyroscope to a position of rest. For example, if the electromagnet would pull the frame $d$ in downward direction only, the gyroscope would respond to such moments by precession and prevent a jerky motion into zero position. However, the electromagnet and its short circuit coil prevent torsion of the gyroscope, the latter does not offer resistance to the motion of the frame $d$ and is jerkily returned into the position of rest.

Special means for eliminating the influence of moments upon the gyroscope in case of accelerations can be dispensed with, as the pendulums deflect also in horizontal position of the plane and interrupt the circuit when the plane is accelerated.

In the construction shown in Fig. 2 the heavy pendulums are replaced by mercury tubes which close the circuit when they are in a position of rest. Mercury pendulums afford the advantage of making perfect contact.

The invention is not restricted to the embodiments shown and described but may be modified in various ways without departing from its fundamental idea, particularly with respect to the construction of the pendulums and of the electromagnet.

I claim:

1. In an artificial horizon indicator for an aircraft, a frame, a gyro vertical mounted for spinning in said frame, shafts carried by said frame defining a normally horizontal axis, a frame pivotally mounted on a normally horizontal axis perpendicular to said first horizontal axis and rotatably supporting the shafts of the first frame, an elongated magnetizable member carried by one of said shafts to turn with said first frame, a two-pole electromagnet arranged adjacent the path of movement of the magnetizable member, an electrical source, pendulums pivoted on mutually normal axes each having contacts associated therewith adapted to be closed when the respective pendulums are in a predetermined position relatively to the aircraft, and a circuit including in series said source and the electromagnet and the contacts so as to energize said electromagnet and move said frames to positions for indicating an artificial horizon when the aircraft is in unaccelerated flight.

2. In an artificial horizon indicator for an aircraft, a frame, a gyro vertical mounted for spinning in said frame, shafts carried by said frame defining a normally horizontal axis, a frame pivotally mounted on a normally horizontal axis perpendicular to the first horizontal axis and rotatably supporting the shafts of the first frame, an elongated magnetizable member carried by one of said shafts to turn with the first frame, a two-pole electromagnet arranged adjacent the path of movement of the magnetizable member, an electrical source, pendulums pivoted on mutually normal axes each having contacts associated therewith adapted to be closed when the respective pendulums are in a predetermined position relative to the aircraft, turn indicators, contacts associated with said turn indicators adapted to be closed in the rest positions of said indicators, and a circuit including in series said source and the electromagnet and the first mentioned contacts and the contacts associated with the turn indicators so as to energize said electromagnet and move said frames to positions for indicating an artificial horizon when the aircraft is in unaccelerated flight in a horizontal position moving along a straight path.

ERHARD HORN.